United States Patent
Echols et al.

(10) Patent No.: US 6,430,175 B1
(45) Date of Patent: *Aug. 6, 2002

(54) INTEGRATING THE TELEPHONE NETWORK AND THE INTERNET WEB

(75) Inventors: Troy Eric Echols, Bolingbrook; John P. Gesslein, Jr., Naperville; Paul David Ksiazek, Hoffman Estates, all of IL (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/073,036

(22) Filed: May 5, 1998

(51) Int. Cl.[7] .................................. H04L 12/66

(52) U.S. Cl. .................. 370/352; 370/410; 370/522; 379/900

(58) Field of Search ............................ 370/352, 354, 370/355, 356, 522, 524, 410; 379/900

(56) References Cited

U.S. PATENT DOCUMENTS

| | | | | |
|---|---|---|---|---|
| 5,889,774 A | * | 3/1999 | Mirashrafi et al. | 370/352 |
| 5,995,606 A | * | 11/1999 | Civanlar et al. | 379/201 |
| 6,026,087 A | * | 2/2000 | Mirashrafi et al. | 370/389 |
| 6,031,904 A | * | 2/2000 | An et al. | 379/201 |
| 6,078,581 A | * | 6/2000 | Shtivelman et al. | 370/352 |

* cited by examiner

*Primary Examiner*—Chau Nguyen
*Assistant Examiner*—Inder Pal Mehra
(74) *Attorney, Agent, or Firm*—Werner Ulrich

(57) ABSTRACT

A method and apparatus for utilizing an Internet web server to direct the processing of operator assistance type calls. A Telephony web browser is connected to a switch to receive customer signals over a voice channel and switch signals over a data channel. Responsive to receipt of inputs over the voice and data channels, the telephony web browser generates a request comprising a uniform resource locator (URL) segment which is transmitted to a web server. The web server responds with a Hypertext Markup Language (HTML) page which the telephony web browser converts into a request to the switch to establish the call connection. The telephony web browser can also control visual display to an operator work station for calls wherein the work station controls the call.

9 Claims, 5 Drawing Sheets

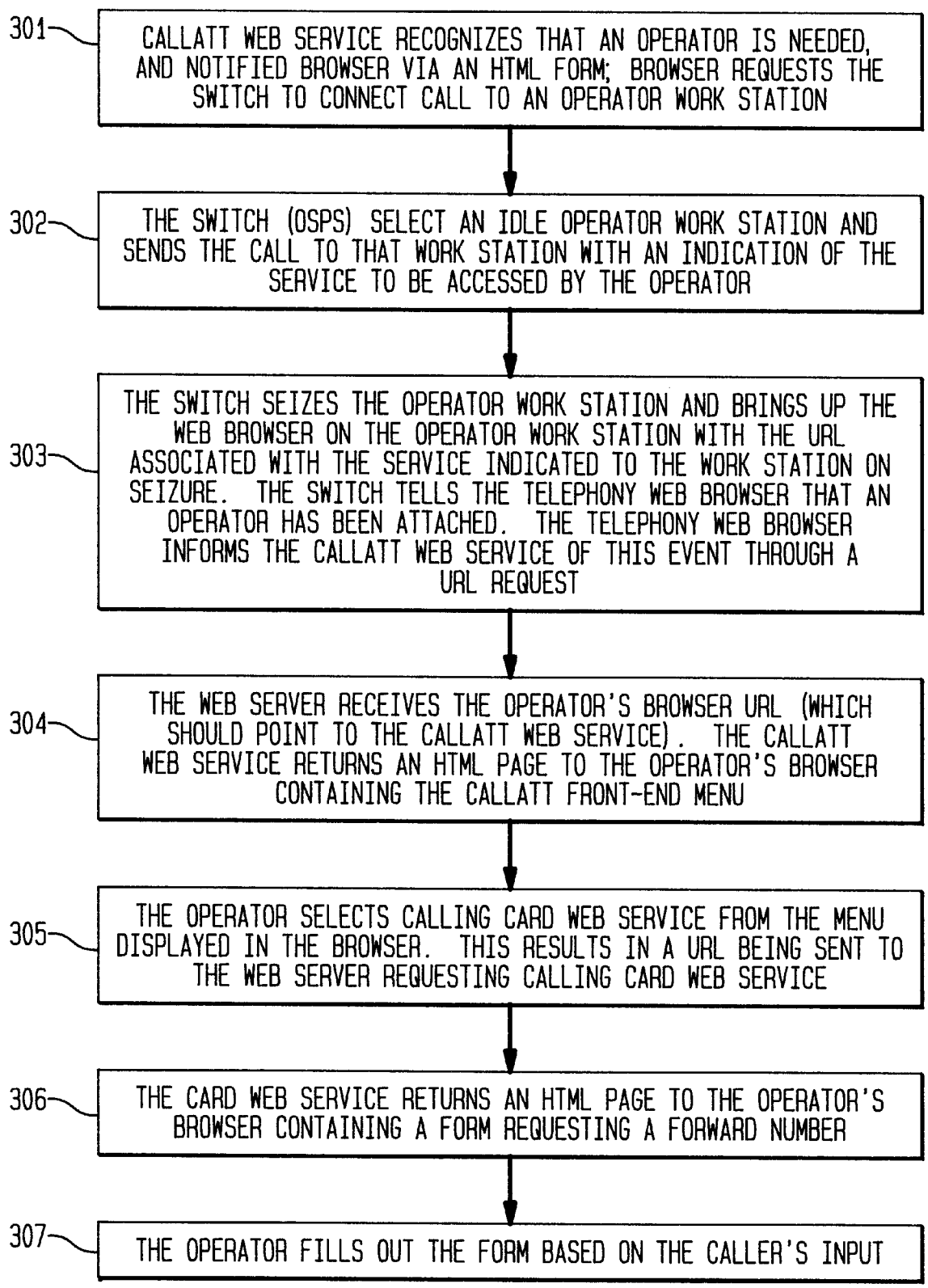

INTEGRATING THE TELEPHONE NETWORK AND THE INTERNET WEB

TECHNICAL FIELD

This invention relates to apparatus and methods for offering telephone services using the Internet to access web pages for implementing the services problem.

Problem

Recently there has been much talk and some action to implement arrangements for permitting Internet customers to bypass the telephone network and communicate directly using the Internet. In addition, the local telephone system is frequently used as the arrangement for accessing the Internet. However, aside from these two examples, the operations of the Internet and the public switched telephone network have tended to remain separate. As a result, the telephone network has not been able to take full advantage of the powerful capabilities of the Internet.

Solution

The above problem is solved and an advance is made over the teachings of the prior art in accordance with this invention wherein telephone callers are connected through switches and the switches are connected through interface equipment with appropriate data stored in an Internet accessed web page. The data found in the web page can be used to control the establishment of telephone connections, to request further directive data from callers, and to return desired data to the callers. For example, this arrangement can be used to provide advanced operator assistance and directory assistance service through successive menus announced based on data from a web page. Control data from the web page can be used to establish operator assistance type telephone connections. The web server can request the switch to establish a connection to a telephone number that has either been previously dialed into the switch by the telephone customer or has been dialed to the telephone resource and forwarded to the web server.

In one preferred embodiment, a telephone user is connected to a telephone switch. This switch is connected internally or externally to a telephony web browser which selects a web server for providing data. The telephony web browser includes a speech processing announcement server which is connected by voice trunks to the switch. The telephone initially communicates with the switch to request service from a web server; in the preferred embodiment, this initial communication is via an "800" number. Thereafter, the telephone resource communicates with a web server through a data connection, and communicates with the telephone through a telephony web browser connected to the telephone by a voice band trunk. The telephone user can communicate with the telephone resource either through dual tone multi-frequency (DTMF) signals or speech input and the speech processing and announcement server communicates with the telephone customer through announcements reflecting the data received from the web server, i.e., the web page. Advantageously, this arrangement allows menu data to be presented to the telephone user and allows the telephone user to select the appropriate menu items or provide proper form input presented in the web page provided by the web server.

When accessed over a telephone line using a telephony web browser, an audio controlled browser, the telephony web browser interprets the HTML (Hypertext Markup Language) output of the web service in a way that is suitable for audio presentation. When used to provide operator services, the web service can be used to drive the telephony web browser to collect digits and play announcements, and can, via the telephony browser, drive the switch for establishing connections. These individual commands can be combined to offer automated collect and automated calling card services. Call control is specified at the web service level using HTML markups created for the purpose of call control. These markups are understood by the telephony web browser and where appropriate, converted in the speech processing and announcement server into audio announcements. The telephony web browser interprets the HTML generated by the web service and converts HTML call control elements to call control elements understood by the switch.

In addition, an operator position may be connected through its own web browser to the web server. The web server can then communicate with the operator position through data displays, (i.e., web pages) and the operator position can send web request data representing operator keystrokes to the web server. Services that are accessed using a visual web browser, e.g., from an operator terminal, may interact with the service as a typical web service. The web service can also drive the operator terminal interface.

BRIEF DESCRIPTION OF THE DRAWING

FIGS. 2–5 are flow charts illustrating the operation of Applicants' invention with respect to a specific application, an automated operator assistance service.

DETAILED DESCRIPTION

Figure 1:
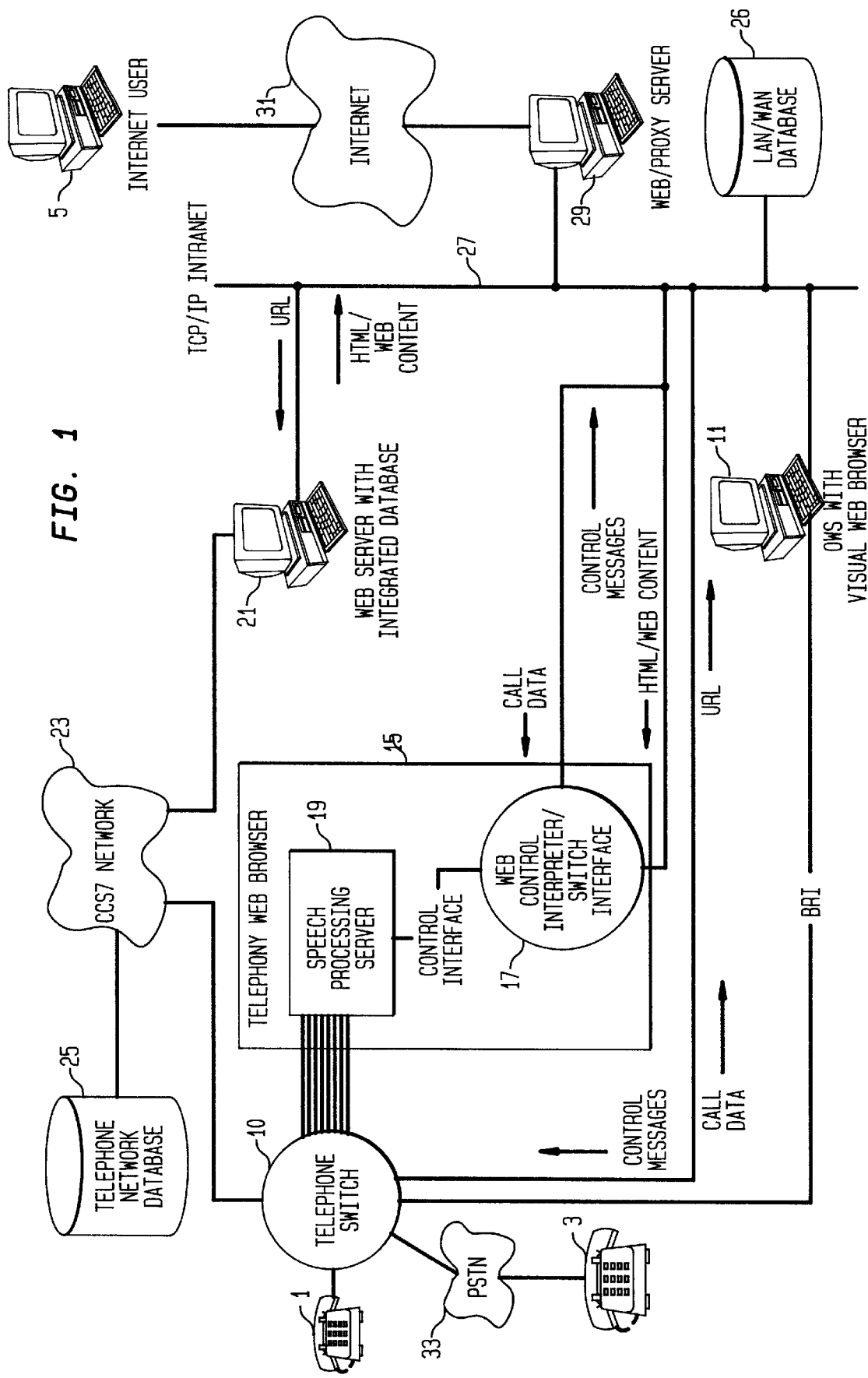
FIG. 1 a is block diagram illustrating the operation of Applicants' invention.

FIG. 1 is a block diagram illustrating the operation of applicants' invention. In this example, it is assumed that telephone station 1 connected to switch 10 wishes to be connected to telephone station 3 via the public switched telephone network 33. In doing so, telephone station 1 is not dialing a simple plain old telephone service (POTS) call wherein the caller dials a number and is then connected to the called party, but is using what has come to be known as operator type services. These include the use of a calling card so that an entity other the calling telephone is charged for the call; arranging that a third party be billed for a call; placing a collect call; perhaps placing a call requiring high grade transmission facilities, etc. Many years ago all such specialized calls required the intervention of an operator at an operator position, but more recently, many such functions have been partly or fully automated.

The switch is connected to a number of specialized facilities. The first is an operator work station 11 having a visual display for communicating with data processors and having a voice interface for communicating with a caller. The operator work station is connected to the switch by a basic rate interface (BRI), i.e., a standard integrated services digital network (ISDN) interface having two voice or data channels (B channels) and 1 control channel (D channel). In accordance with the principles of applicants' invention, the work station is connected via an intra-net network with a web server 21 and a web/proxy server 29. The web server 21 communicates with the work station 11 using HTML (Hyper Text Mark-Up Language), a standard language for communicating from web servers to web browsers. The operator work station 11, which is equipped with the software providing a visual display web browser communicates with web server 21 using the hypertext transfer protocol (HTTP) and contains a request for a uniform resource locator (URL) identifier used by web browsers to access web servers. Based on information received orally from the caller at station 1 or on control information such as the number dialed by caller one and/or caller one's number as determined by automatic number identification as received from switch 10 over the control channel of the connecting BRI or over the connection to the web server 21, which inputs are either heard by the operator or displayed at the visual monitor of station 11 in response to the control signals sent from switch 10 or from the web server 21, the operator makes a request which is interpreted by the visual web browser software in work station 11, and is sent as a request to web server 21. In response to this request, the web server sends back a message in HTML which message is displayed on the monitor of station 11. The request may be in the form of a blank or partly filled out form for which the operator is to supply requested information. The requested information is either obtained orally from the caller or obtained from switch or based on information already received from the switch. When the form is completed, a second request is sent to the web server 21 in an HTTP message. The HTTP request includes a new URL request type coupled with the data of the filled out form. The server 21 responds with another HTTP message containing an HTML page which when displayed to the operator tells the operator how the call is to be processed.

To process operator assistance calls automatically, the OSPS switch 10 is also connected to a telephony web browser 15. The telephony web browser interfaces with callers through announcement to the caller and through the recognition of speech commands, and dual tone multi-frequency (DTMF) signals keyed by the caller. The telephony web browser also communicates with the OSPS switch through the exchange of signaling messages. The telephony web browser comprises a speech processing and announcement server 19 for interfacing with telephone users and with switch 10 while the switch/web interface interfaces with the web server 21. The speech processing and announcement server (SPAS) 19 is connected to switch 10 by a T1 carrier connection for carrying voice channels and a data link for carrying signaling messages in the TCP/IP (Transport Control Protocol) (layer 4)/(Internet Protocol (layer 3). In Applicants' preferred embodiment, the SPAS is a (Conversant®) system model CVIS which interfaces directly with a T1 carrier stream and can process the 24 channels of a T1 carrier stream in parallel. The switch web interface (SWI) 17 is a browser for sending call control signals to SPAS 19 which signals direct the SPAS to perform a speech processing function (synthesizing or recognizing speech or dual tone multifrequency (DTMF) tones). The SPAS then generates an output message to web server 21. The message contains a uniform resource locator (URL) identification; the web server 21 responds with a HTTIP message containing an HTML segment converted by SWI 17 into control requests for the SPAS 19. The control requests include requests to play an announcement to the caller and to collect speech and/or DTMF commands from the caller. Web server 21 can request information from telephone network data base 25 either directly through the CCS7 network 23 or by passing a request for such information through the telephony web browser to the switch, and having the switch obtain the information through the CCS7 network 23, and return the requested information via the telephony web browser to web server 21. The direct approach, i.e., directly from web server 21 to CCS7 network 23, is preferable, but in some cases the use of a special interface between switch 10 and network data base 25 can allow web server 21 to access the required data indirectly without requiring the web server to implement the special interface already implemented on switch 10.

Figure 2:
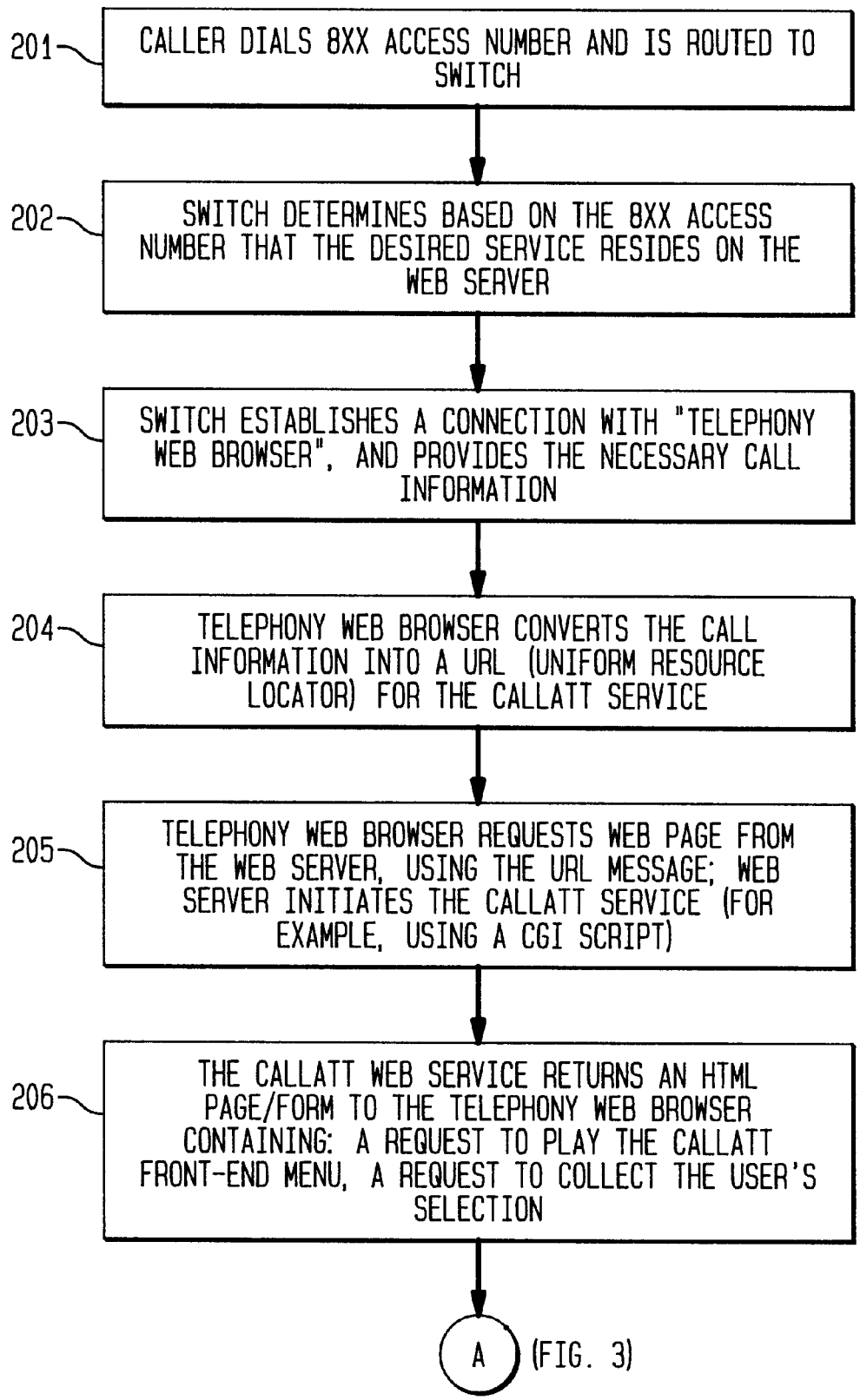
Figure 3:
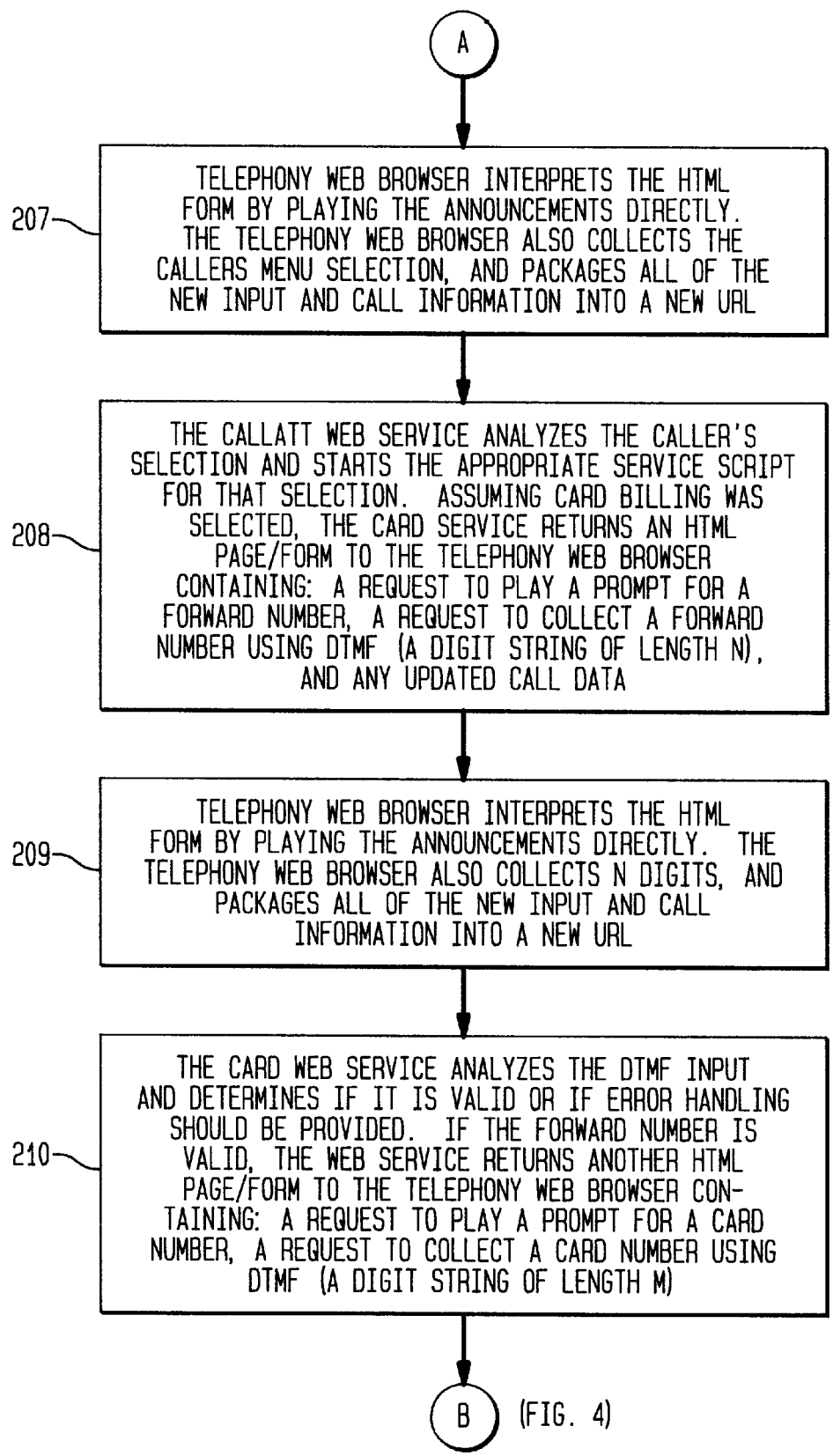
Figure 4:
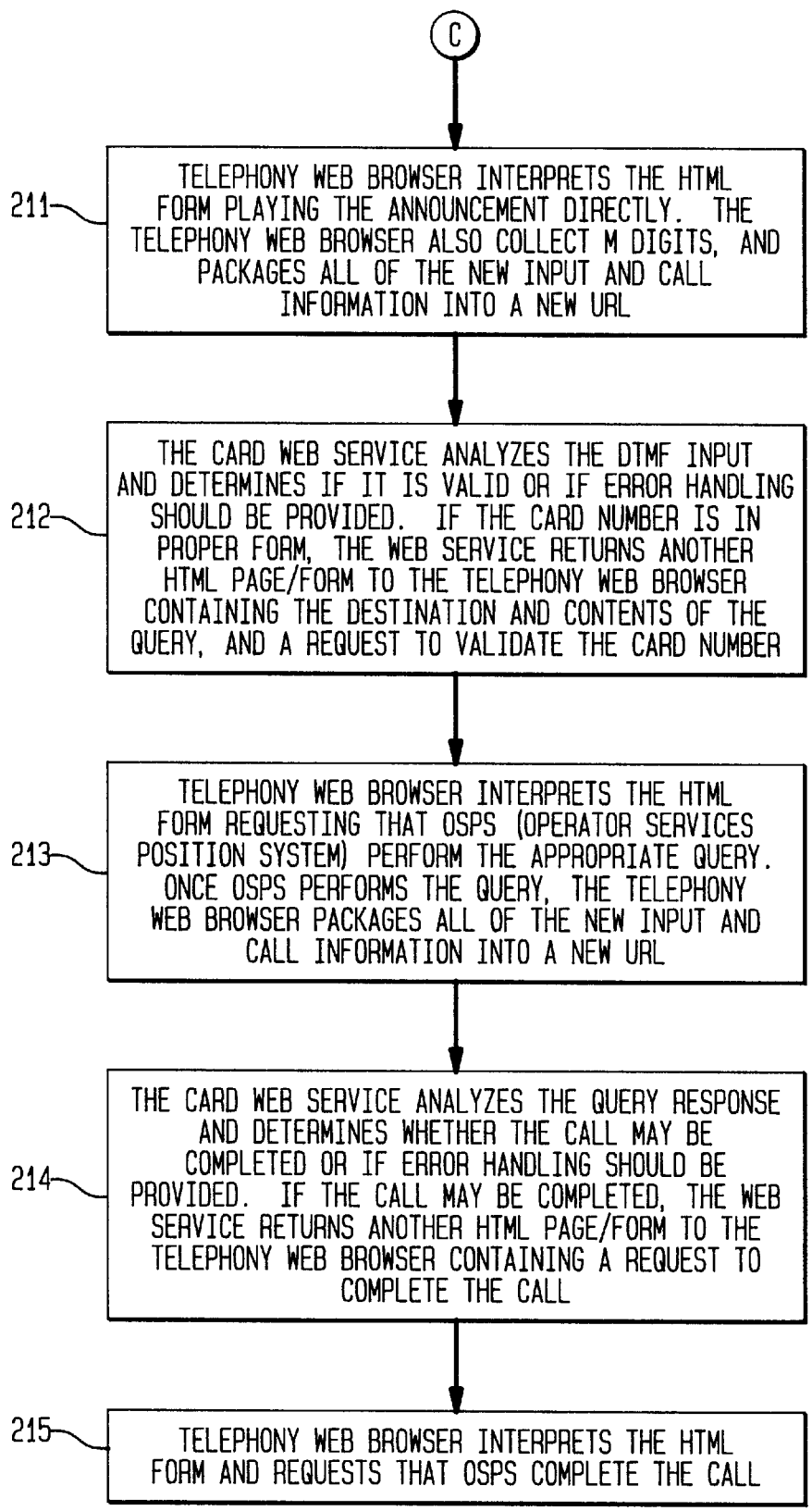

FIGS. 2–4 are flow charts illustrating the operation of Applicants' invention, in this case for implementing a general operator assistance service. An example of such a service is AT&T's "800 CALLATT$^{SM}$") service which has been implemented using more conventional approaches. The advantage of implementing this service using a web server is that new features can be added to the general operator assistance service more readily and that additional data bases accessible via the Internet can be used to enhance the service. For example, the data base of a new calling card vendor can be readily accessed without requiring new software in the switch. For operator service features, changes can be readily implemented by changes or additions in an HTML page without requiring software changes in the switch. The changes, for example, changes in the order or content of prompting announcements, can be used for automated calls or operator-handled calls; a single set of HTML pages can serve both purposes.

FIGS. 2–4 show the processing of a call using only the automated equipment and FIG. 5 shows the processing of the call when the use of automated equipment is inadequate and the call is routed to an operator work station 11. This could happen, for example, if the caller persists in entering an incorrect calling card number. The call is initiated when the caller dials "1-800-224-4288" (1-800-CALL-ATT). (The term "8XX" is used for 800, 888 and other future toll free prefixes). This call is then routed on the basis of the dialed number to a switch equipped with operator service position service (OSPS). (Action Block 201, FIG. 3). The switch determines, based on the dialed number, that the desired service resides on the web server 21. (Action Block 202). The switch establishes a connection with the telephony web browser 15, and provides the necessary call information to that unit (Action Block 203). The telephony web browser converts the call information into a uniform resource locator (URL) identifier for the call ATT web service (Action Block 204). The switchweb interface requests the appropriate web page from the web server using the URL. The URL is used to retrieve a Common Gateway Interface (CGI) script which activates a web server process to run the script (Action Block 205). Alternatively, arrangements for implementing interactive web services, such as active server pages, server side Javascripts, or servlets can be used to run the script. The CALLATT web service returns an HTML page/form to the switch/web interface containing: a request to play the call CALLATT front end menu, a request to collect the user's selection (Action Block 206). The switch/web interface interprets the HTML form and requests the SPAS to play the opening announcement for call ATT. The SPAS collects the callers menu selection and passes this information to the switchweb interface which packages the new input and call information into a new URL which is transmitted to the web server (Action Block 207, FIG. 3).

The CALLATT web service analyzes the callers selection as received in the new URL and starts the appropriate service script for that selection (Action Block 208). Assuming that caller card billing was selected, the web service returns an HTML page/form to the switch/web interface containing a request to play a prompt for a forward number (called number), a request to collect a forward number using DTMF (a digit string of length "n"). The switch/web interface interprets the HTML form by causing the SPAS to play the appropriate announcement. The SPAS collects end digits, and passes this information to the switch/web interface which uses this information to generate a new URL (Action Block 209). The web server analyzes the DTMF input (received in the URL), and determines if it is valid or if error handling should be provided. If the forward number is valid, the web service returns another HTML page/form to the switch/web interface containing: a request to play prompt for a card number, a request to collect a card number using DTMF (a string of length "n"), (Action Block 210). The switch/web interface interprets the HTML form and causes the SPAS to play the announcement and collect the n digits. When these digits have been collected, all of the new input and call information is packaged into a new URL by the switch/web interface (Action Block 211, FIG. 4). The web server analyzes the DTMF input received in the new URL and determines if it is in proper form, or if error handling should be provided. If the card number is in proper form, the web service returns another HTML page/form to the switch-web interface containing the destination and contents of the query and a request to validate the card number (Action Block 212). The switch/web interface interprets the HTML form and causes the SPAS to request that the switch perform the appropriate query. When the switch has performed the query and transmitted the results to the SPAS, the switch/web interface packages all of the new input and call information into a new URL (Action Block 213). The web server analyzes the data in the new URL, and determines whether the call may be completed or if error handling should be provided. If the call may be completed, the web service returns another HTML page/form to the switch/web interface containing a request to complete the call (Action Block 214). The switch/web interface interprets the new HTML form and causes the SPAS to request that the switch complete the call (Action Block 215).

In this example, the switch performs the query required to validate a calling card number. This is done in order to take advantage of the extensive software already in existence in operator switches to perform such a query. At some later time, it may be desirable to use the more direct approach of sending the query directly from the web server to an appropriate data base. This option further has the advantage of allowing data bases attached to the Internet to be queried for data bases such as data base 26 attached to a local or wide area network of an Intranet to be queried.

Data base 26, accessible via Intranet 27 is also used to provide data not available to web server 21, which data is not necessarily related to the telephone network data base 25. For example, data base 26 may contain additional directory assistance type information such as a 9 digit zip code not available in the telephone network data base 25. Web server 29 is not restricted to telephone applications, but is a more general web server. It is accessed by Internet user 5 via Internet 31. For cases in which a caller has both the telephone and an Internet terminal, the web functions of web server 29 can be invoked at the same time as the functions of web server 21, and messages between the two can be exchanged.

FIG. 5 illustrates the actions performed for a call requiring the use of the operator. This may be because the caller is incapable of communicating correctly with the telephony web browser (language difficulties, inarticulate speech call situation too complex for the telephony web browser), or it may be if for example, the caller makes a persistent mistake in specifying either the called number or a calling card number. In either case, the telephony web browser requests the switch to establish a connection to an operator work station (Action Block 301). The switch connects an idle operator work station and sends the call to that work station with an indication of the service to be accessed by the operator (Action Block 302). The switch seizes the operator work station and brings up the web browser on that work station and provides that work station with the URL identification of the call, and the type of service indicated for that call. The switch tells the telephony web browser that an operator has been attached, and the telephony web browser informs the web service of this event through a URL request (Action Block 303). The web server receives the URL request and returns an HTML page to the operator's browser, the page containing the CALLATT front-end menu (Action Block 304). The operator selects calling card service from the menu displayed in the browser. This results in the URL request being sent to the web server requesting calling card service (Action Block 305). The calling card web service returns an HTML page to the operator's browser containing a form requesting a forward number (Action Block 306). The operator fills out the form based upon the caller's input (Action Block 307). The subsequent steps are similar to the steps performed by the telephony web browser, but are under the control of the operator who is able to interact more effectively with the caller.

Below are two examples of HTML web pages. The first is for controlling the process of collecting the forward number (i.e., the called number); the second is for completing the call:

Example: Forward Number Collection Form

```
<HTML>
<HEAD><TITLE>Forward Number Collection Form</TITLE></HEAD>
<BODY>
<FORM NAME="CollectForwardNumberDigits"
   METHOD="POST"ACTION="/CGI-bin/
   processForwardNumber">
<A NAME="PMLIVR"></A>
<AUDIO MV ARSRC=msg>
<INPUT NAME=digits MAXLENGTH=numDigits
   TIMEOUT=5 VALUE="">
<INPUT TYPE=SUBMIT>
</FORM>
</BODY>
</HTML>
```

This HTML file, entitled "Forward Number Collection Form", contains a single form called "CollectForwardNumberDigits". The form is to be "filled out" by the browser and then submitted to the web server from which the web page originated using the HTTP POST method. The web server should then pass the form data to the program identified by the address "/CGI-bin/processForwardNumber".

The form instructs the browser to go into IVR (Interactive Voice Response) mode (disables the browser's forward and back "buttons"). The form next informs the browser to play an audio file (=msg), which prompts the caller for a destination number. The browser is informed to then collect a maximum of numDigits digits, with a 5 second timeout between digits. The results of the digit collection are populated into the field named "digits", where the default value is "". After this field is filled out, the form is submitted.

Example: Call Completion Form

```
<HTML>
<HEAD><TITLE>Call Completion Form<TITLE></HEAD>
<BODY>
<FORM NAME="PerformCallCompletion"METHOD-
   "POST"ACTION=cgi-bin/
   process\callCompletionResults">
<NAME="IVR"></A>
```

```
<INPUT NAME=call_CompletionResults TYPE=
  HIDDEN    CLASS=CALL_COMPLETION
  DN=dialedNumber RINGS=3 RETRIES=0 VALUE=
  "FAILURE">
<INPUT TYPE=SUBMIT>
</FORM>
</BODY>
</HTML>
```

This HTML file, entitled "Call Completion Form", contains a single form called "PerformCallCompletion". The form is to be "filled out" by the browser and then submitted to the web server from which the web page originated using the HTTP POST method. The web server should then pas the form data to the program identified by the address "/CGI-bin/processCall completion Results".

The form instructs the browser to go into IVR mode (disables the browser's forward and back "buttons"). The form next informs the browser to attempt call completion to a particular DN (=dialedNumber). The browser should allow for 3 rings before giving up, and should not retry call completion. The results of the call completion attempt are populated into the field named "CallCompletion Results", where the default value is "FAILURE". After this field is filled out, the form is submitted.

The above is one example of the application of Applicants' invention. Many other embodiments will be apparent to those of ordinary skill in the art. The invention is only limited by the attached claims.

What is claimed is:

1. Apparatus for controlling establishment of a telephone call connection, comprising:

a telephone switch;

a telephony web browser; and a web server;

said telephony web browser connected to said switch by voice channels and a data channel;

said telephony web browser connected to said web server by a data channel;

said switch responsive to a customer request for establishing said telephone call connection for requesting said telephony web browser to generate requests comprising a resource locator segment for transmission to said web server;

said web server responsive to requests containing said resource locator segment for responding with a page;

said telephony web browser responsive to contents of said page received from said web server for transmitting a request over said data channel to said switch to establish a connection;

said switch responsive to said request for controlling establishment of said connection.

2. The apparatus of claim 1 wherein said telephony web browser comprises:

a speech processing and announcement server for generating announcements to be played to a telephone user and for collecting DTMF (Dual Tone Multi-Frequency) signals from said user;

said telephony web browser further comprising a switch/web interface for converting signals received by said speech processing and announcement server into a resource locator request.

3. The apparatus of claim 2 further comprising:

an operator work station with visual web browser connected to said switch and to said web server;

said operator work station equipped with a visual web browser for generating requests comprising a resource locator to said web server, and responsive to pages received from said web server for generating a display to instruct an operator at said operator work station to perform appropriate call control functions.

4. The apparatus of claim 1 wherein said resource locator is a URL (uniform resource locator).

5. The apparatus of claim 1 wherein said page is an HTML (Hypertext markup language) page.

6. In a telephone switch adapted to establish operator assistance type calls, a method of controlling establishment of a telephone call connection comprising the steps of:

transmitting a customer request for establishing said telephone call connection to a serving switch;

responsive to receipt of said customer request, transmitting data commands to a telephony web browser over a voice or data channel;

said telephony web browser, responsive to receipt of said commands, generating and transmitting requests comprising a resource locator segment to a web server for responding with a page of text;

said telephony web browser responsive to said page of text received from said web server, for transmitting a request over said data channel to said switch to control establishment of a telephone call connection; and said switch responsive to said request for controlling establishment of said connection.

7. The method of claim 6 further comprising the steps of:

said telephony web browser generating announcements to be played to a telephone user;

said telephony web browser collecting DTMF (Dual Tone Multi-Frequency) signals from said user; and said telephony web browser converting signals received over said voice and data channels into a resource locator request.

8. The method of claim 7 further comprising the steps of:

connecting an operator work station with visual web browser to said switch and to said web server;

said operator work station generating requests comprising a resource locator to said web server; and said operator work station, responsive to pages received from said web server, generating a display to instruct an operator at said operator work station to perform appropriate call control functions.

9. The apparatus of claim 1, wherein each telephony web browser further transmits another request;

said switch responsive to said another request to further control said telephone call connection.

* * * * *